Sept. 7, 1926.
P. VOSEN
NUT LOCK
Filed July 17, 1926
1,598,946
Fig.1.
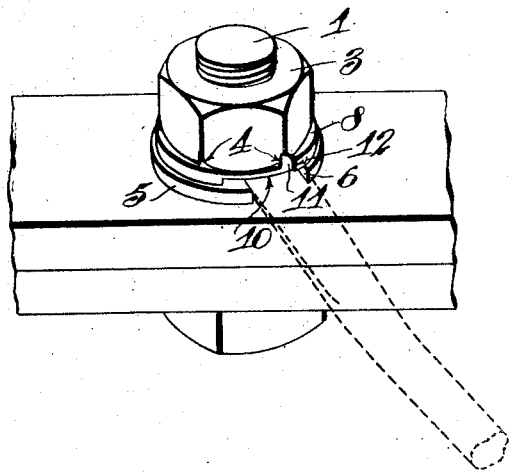
Fig.3.
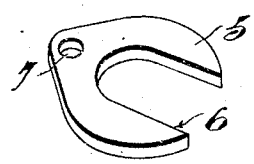
Fig.4.
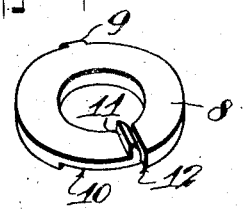
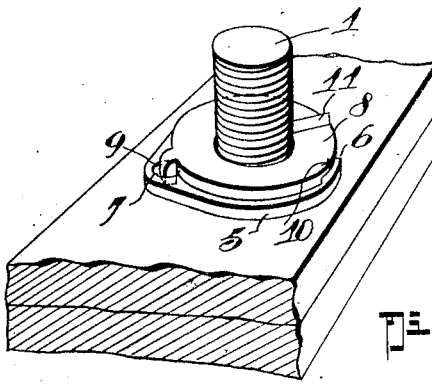
Fig.2.
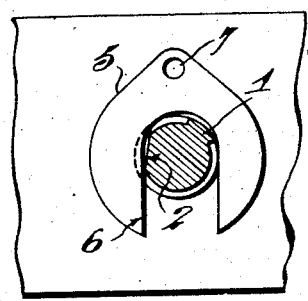
Fig.6.
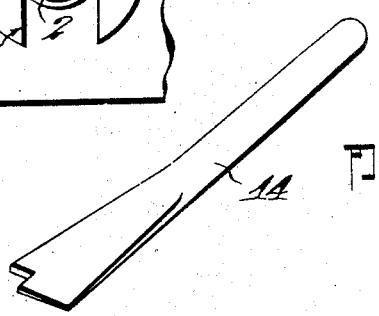
Fig.5.
INVENTOR
Peter Vosen.
BY
ATTORNEY Patented Sept. 7, 1926.

1,598,946

UNITED STATES PATENT OFFICE.

PETER VOSEN, OF FLANDERS, ONTARIO, CANADA.

NUT LOCK.

Application filed July 17, 1926. Serial No. 123,147.

My invention relates to certain new and useful improvements in nut locks and the particular object of my invention is to provide a locking means for nuts to positively prevent reverse or unscrewing movement when attached; more specifically the invention has for its object to simplify and improve the construction of nut lock disclosed in my application filed October 20, 1925, Serial No. 63,709.

In its more general nature the invention resides in those novel features of construction, combination and arrangement of parts which will be first fully described, then be specifically pointed out in the appended claims, reference being had to the accompanying drawing, in which:—

Figure 1 is a perspective view showing my invention in use.

Figure 2 is a perspective view with the nut removed.

Figure 3 is a perspective view of the bolt locking washer.

Figure 4 is a perspective view of the nut locking washer.

Figure 5 is a perspective view of a releasing key.

Figure 6 is a horizontal section showing bolt locking washer in place.

In the drawing in which like numerals of reference indicate like parts in all the figures, 1 represents the bolt which is provided with a flat portion 2 and which receives the nut 3, the latter having ratchet notches 4 arranged on its securing face, these notches running from the bore of the nut to the outer margin.

The bolt locking washer 5 is provided with a slot 6 so that this washer may be slipped over the flat part of the bolt even if the nut has been partly screwed on, and it is provided with an aperture 7 to receive the lug 9 of the nut locking washer 8.

The nut locking washer 8 is slit as at 12 and has a portion of one face removed, as at 10, to provide a resilient tongue, the front end of which is provided with a locking tooth 11 to engage the ratchet notches 4 of the nut.

It will be observed that with the parts assembled the tongue of the locking washer, i. e., that portion having the tooth 11, lies in the open end of the slot 6 of the bolt locking washer so that the insertion of a key 14, the front of which is of wedge shape, between the nut and the adjacent face of the lock washer tongue, the tooth 11 may be pryed backwardly out of the ratchet notches 4 so that the nut may be unscrewed and released.

By my present construction it will be seen that the bolt locking washer may be inserted in either of two directions, diametrically opposite one another, and thus give two positions in which the parts may be assembled.

From the foregoing description, taken in connection with the accompanying drawing, it is thought the complete construction and advantages of my invention will be clear to those skilled in the art to which it relates.

What I claim is:

1. In combination with a bolt and a nut, said bolt having a flat, a bolt locking washer having an open slot to fit over the bolt and having an aperture, a nut locking washer interposed between said bolt locking washer and the nut and provided with a lug to enter said aperture to hold said washers against turning relatively to one another, said nut locking washer having its nut engaging face plane and being split, the face of said nut locking washer lying opposite the bolt locking washer being recessed from the split a sufficient distance to constitute a spring tongue, said tongue having a lateral bevelled tooth portion and said nut having correspondingly shaped notches to receive said lateral bevelled tooth portion, all being arranged whereby said bolt locking washer may be slipped into place or removed while a nut is loose on the bolt.

2. In combination with a bolt and a nut, said bolt having a flat, a bolt locking washer, having an open slot to fit over the bolt and having an aperture, a nut locking washer interposed between said bolt locking washer and the nut and provided with a lug to enter said aperture to hold said washers against turning relatively to one another, said nut locking washer having its nut engaging face plane and being split, the face of said nut locking washer lying opposite the bolt locking washer being recessed from the split a sufficient distance to constitute a spring tongue, said tongue having a lateral bevelled tooth portion and said nut having correspondingly shaped notches to receive said lateral bevelled tooth portion, said tongue lying opposite the open end of said slot in said bolt locking washer, whereby said tongue may be sprung back by a key into said slot to release the nut.

PETER VOSEN.